United States Patent [19]

Pratt

[11] Patent Number: 5,564,044
[45] Date of Patent: Oct. 8, 1996

[54] INTEGRATION OF RESULT DATA FROM FIRST PROGRAM OPERATIONS ON DYNAMIC SOURCE DATA INTO DATA OF A SECOND PROGRAM

[75] Inventor: John M. Pratt, Atkinson, N.H.

[73] Assignee: Wang Laboratories, Inc., Billerica, Mass.

[21] Appl. No.: 224,412

[22] Filed: Apr. 15, 1994

[51] Int. Cl.⁶ .......................... G06F 17/00; G06F 19/00
[52] U.S. Cl. .................... 395/600; 395/650; 364/DIG. 1
[58] Field of Search .................................... 395/600, 650, 395/575, 700

[56] References Cited

U.S. PATENT DOCUMENTS

| | | | |
|---|---|---|---|
| 4,916,610 | 4/1990 | Bapat ................................... | 364/300 |
| 5,063,523 | 11/1991 | Vrenjak ................................ | 395/200 |
| 5,159,687 | 10/1992 | Richburg .............................. | 395/700 |
| 5,301,326 | 4/1994 | Linnet et al. ........................ | 395/700 |
| 5,303,379 | 4/1994 | Khoyi et al. ......................... | 395/700 |
| 5,404,528 | 4/1995 | Mahajan ............................... | 395/650 |
| 5,414,809 | 5/1995 | Hogan et al. ........................ | 395/155 |

Primary Examiner—Thomas G. Black
Assistant Examiner—C. Pham
Attorney, Agent, or Firm—Ronald J. Paglierani

[57] ABSTRACT

A mechanism and a method for integrating first data created by a first application program and residing in a first data object belonging to the first application into a second data object where the first data is result data generated by operation of the first application program upon source data of the first application program. A computer system includes an integrated operating environment. A user creates and stores a script identifying the source data and directing the operation of the application program to generate the result data from the source data and inserts a reference to the script in the second data object, wherein the reference identifies the script, the application program and an operation of the application program to execute the script. The user may then invoke the reference to indicate that a current version of the result data derived by operation upon a current version of the source data is to be provided to the second data object, whereupon the system resolves the reference to identify the script, the application program and the operation of the application program to execute the script and invokes the application program to execute the script to generate the result data from the source data and to provide the result data to the second data object.

10 Claims, 1 Drawing Sheet

INTEGRATION OF RESULT DATA FROM FIRST PROGRAM OPERATIONS ON DYNAMIC SOURCE DATA INTO DATA OF A SECOND PROGRAM

CROSS REFERENCES TO RELATED APPLICATIONS

This patent application is related to:

FIELD OF THE INVENTION

The present invention relates to a means for integrating data between applications programs executing in an integrated operating environment by embedding a reference to first data created by a first application program into second data created by a second application program and, more particularly, for integrating data between applications wherein the first data is result data generated by operation of the first application program upon source data of the first application program.

BACKGROUND OF THE INVENTION

Recent years have seen the development and adoption of integrated operating environments, such as Microsoft Windows[1] and New Wave[2], for virtually all computer data processing systems wherein an integrated operating environment is comprised of operating system functions together with a plurality of other functions, such as user interface and data exchange and integration functions, which may be used in common by applications programs written to execute in the integrated operating environment. Such integrated operating environments usually provide a variety of means by which first data created by a first application program and residing in a first file or object belonging to the first application program may be integrated into second data created by a second application program and residing in a second file or object belonging to the second application program.

[1]Microsoft and Windows are trademarks of Microsoft Corporation
[2]New Wave is a trademark of Hewlett-Packard Corporation.

The integration of data between applications programs in integrated operating environments of the prior art customarily involves the embedding of a reference to the first data in the second data. The integrated operating environment is responsive to the invocation of the second application program or to an indication by a user of the second application program of an operation to be performed on the embedded first data to invoke either the first application program or a local handler designed to emulate at least some of the functions of the first application program and to provide the embedded reference to the first data to the first application or local handler. The first application or local handler will then open the first file or object, resolve the reference to first data, and provide a current copy of the first data from the first file or object to the second application through the integrated operating environment's data transfer mechanisms. The updated copy of the first data will then appear in the second data.

To illustrate by way of example, Microsoft Windows provides two mechanisms for embedding or linking data from a first data file into a second data file. The first uses the Windows Clipboard to perform a copy and paste operation and the second uses Object Linking and Embedding (OLE) and Dynamic Data Exchange (DDE) to link a copy of the data from the first data file into the second data file. Both methods require that either the first application program that generated the first data file or a local handler capable of performing the required functions of the first application program be invoked for each embedding and updating of data and differ primarily in that OLE provides automatic invocation of the first application program while the clipboard requires that the user invoke the first application program manually.

That is, when using the Clipboard the user must invoke the first application program and, using the first application program, either indicate the data to be copied or use the first application program to generate and then indicate the data to be copied. The user then uses the Copy function to copy the data to the Clipboard and then goes to the second application program, which was used to generate the second data file, and uses the paste operation to paste the data from the first data file into the second data file. This sequence of operations must then be repeated each time the copied data is to be updated.

OLE requires the same initial steps to initially embed the data from the first file into the second file but differs in that the data from the first file is "linked" into the second file through DDE by embedding a reference in the second file to the data from the first file. The OLE will then use the embedded reference and link to the first data file to copy the data from the first file to the second file through DDE so that the data appears to reside in the second file. Thereafter, the embedded data may be updated each time the second data file is opened by the second application program, either manually by using the manual update function or dynamically by using the automatic update function. OLE performs the updating operation, however, by using the embedded reference and the link to invoke the first application program, the first application program to make a new copy of the data, and DDE to provide the new copy from the first application program to the second application program.

It must be noted that both of these data integration methods of the integrated operating environments of the prior art permit only a copy of the data from the first file to be provided to the second file and that only the copy of the embedded data can be updated. That is, these methods are capable only of copying already existing data from the first file. This limitation, in turn, results in severe problems when the first application is of the type which operates upon original or raw data, referred to hereafter as source data, to generate new data, referred to hereafter as result data wherein the source data is dynamic, that is, may change with time. Examples of such first applications would include database inquiry programs, spreadsheet programs, financial programs, and so forth.

Because the data integration methods of the prior art permit only copies of either or both of the source data or the result data of the first application to be embedded in the data of the second application and to be updated, potentially severe problems may arise when the source data of the first application changes. That is, if the source data changes, for example, because of new additions to or changes to the source data in a database or to the input data to a spreadsheet or financial prediction or analysis program, the result data will not change until the first application program has been invoked and directed by the user to re-execute the operations which operated upon the source data to generate the result data. As a result, the result data will be out of synchronization with the source data, that is, will be in error with respect to the current source data and will not reflect the current source data, and this error will be carried over to the copy of the data embedded in the second data file, regardless of how often the embedded data is updated through the data integration means. In other instances, the first application, by design or user choice, may not save the result data from a given operation on the source data and, as a consequence, there will be no result data to be embedded into the second data.

The present invention provides a solution to these and other problems of the data integration methods of the integrated operating environments of the prior art.

SUMMARY OF THE INVENTION

The present invention provides a mechanism and a method for integrating first data created by a first application program and residing in a first data file or object belonging to the first application into a second data file or object belonging to a second application, or into a second data file or object of the first application, where the first data is result data generated by operation of the first application program upon source data of the first application program.

The present invention includes a computer system including a plurality of applications programs and objects for storing data, a memory and processor for storing and executing the application programs, and an integrated operating environment, and the means for integrating result data from a first data object into a second data object wherein the result data is generated by operations performed on source data by an application program. According to the present invention, a user creates and stores a script identifying the source data and directing the operation of the application program to generate the result data from the source data and inserts, a reference to the script in the second data object, wherein the reference identifies the script, the application program and an operation of the application program to execute the script. The user may then invoke the reference to indicate that a current version of the result data derived by operation upon a current version of the source data is to be provided to the second data object, whereupon the system resolves the reference to identify the script, the application program and the operation of the application program to execute the script and invokes the application program to execute the script to generate the result data from the source data and to provide the result data to the second data object.

In further aspects of the present invention, the user inserts the reference into the second data object at the location in the second data object where the result data is to appear, creates a corresponding result data object to receive the result data. The user then creates a corresponding interface defining operations of the integrating operating environment to be performed with respect to the result data object, creates a moniker corresponding to the result data object, the moniker including information identifying the script, provides a verb identifying the operation of the application program to execute the script, and obtains a unique identifier identifying the application program from an application program registration database of the integrated environment.

In still further aspects of the present invention, the resolution of the reference includes resolving the moniker information identifying the script to identify the location of the script in the computer system, indexing the program registration database with the unique identifier to identify the application program, and providing the identification of the application program, the location of the script and the verb to the application program.

In yet further aspects of the present invention, the providing of the result data to the second data object is accomplished by invoking a data exchange mechanism of the integrated operating environment and providing the result data to the data exchange mechanism.

In an alternate embodiment of the present invention, the script associated with the first data object includes commands directing a data exchange mechanism of the integrated operating environment to provide the result data to the second data object and a second script is associated with an application program for operating upon the second data object a second script for directing the invocation of the application program of the first data object. The second script directs the application program associated with the second data object for requesting an exchange of the result data from the first data object, identifying the result data and the application program of the first data object and directing the execution of the script associated with the application program of the first data object.

The second script is responsive to the invocation of the reference to the result data for invoking the application program associated with the first data object and providing the identifications of the application program associated with the first data object and the associated script to the application program associated with the first data object and the script associated with the first data object is responsive to the invocation of the script associated with the first data object for invoking the data exchange mechanism of the integrated operating environment and providing the result data to the data exchange mechanism.

Other features, objects and advantages of the present invention will be understood by those of ordinary skill in the art after reading the following descriptions of a present implementation of the present invention, and after examining the drawings, wherein:

DETAILED DESCRIPTION

A. General Description (FIG. 1)

Figure 1:
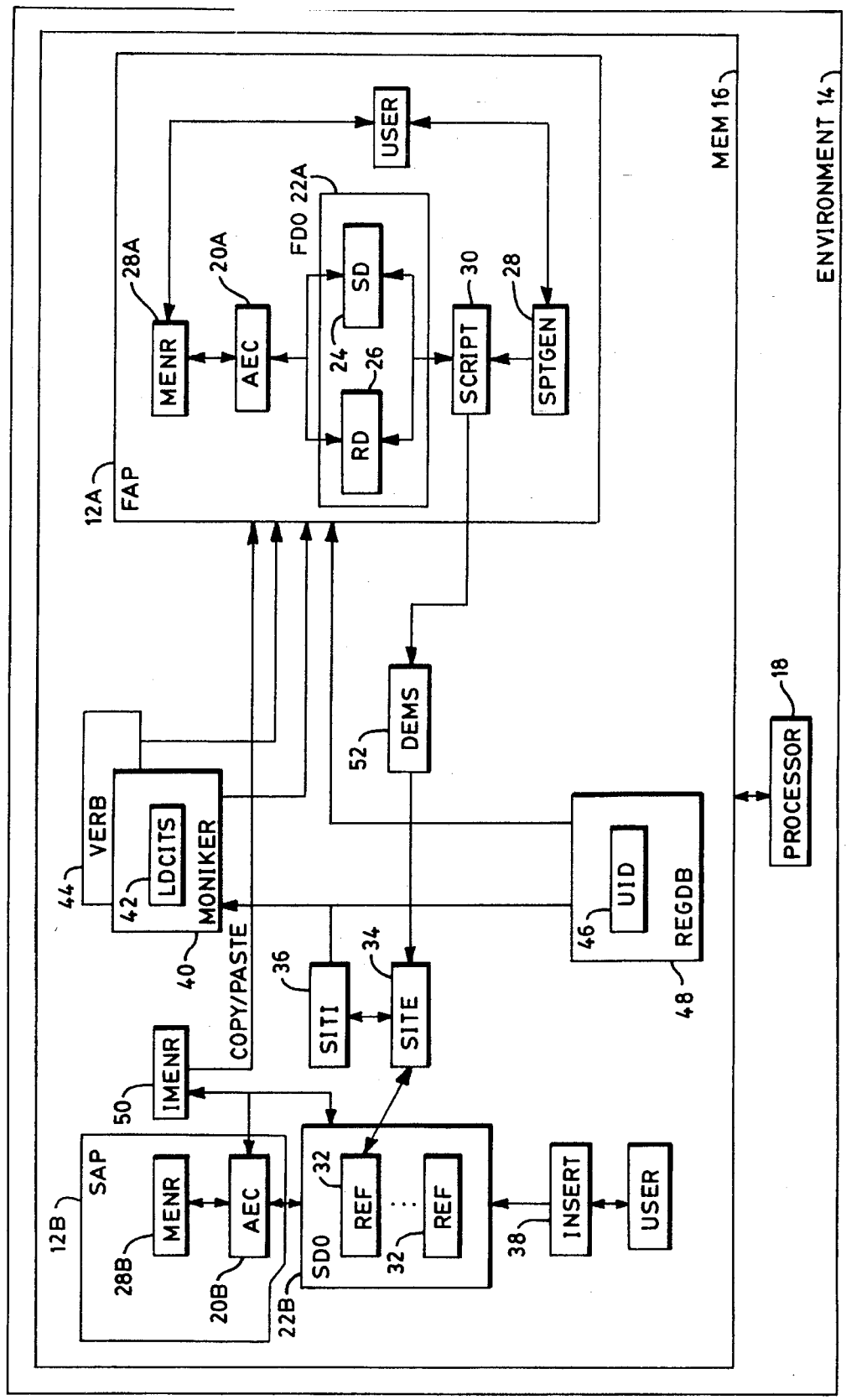
FIG. 1 is a diagrammatic representation of the system of the present invention.

Referring to FIG. 1, therein is presented a diagrammatic representation of a Data Processing System 10 implementing the present invention. As will be described below, the present invention provides a means for integrating first data created by a first application program and residing in a first data file or object belonging to the first application into a second data file or object belonging to a second application, or into a second data file or object of the first application, where the first data is result data generated by operation of the first application program upon source data of the first application program.

According to the present invention, the user will create a "script" which is stored as an object or file associated with the first application program wherein a "script" directs the first application program to perform the operations on the source data that are necessary to generate the result data. A "script" may be generally described as a script, program, routine, macro, instruction or command for directing the first application to perform an operation or sequence of operations on the source data to generate the result data, such as an SQL query of a database, and may range from accessing and copying an identified body of source data in a file to complex manipulations of the source data to generate new data.

The user may insert a reference to the script into the second data file or object, either into the menus or commands of the second application program, that is, into the application program that normally operates upon the second data file, or into the second data file or object itself. In the first case, the reference can be inserted, for example, as a new menu pick with accompanying script to reference the first data and invoke the first application program to execute the query. The user may then update the data by invoking the menu pick, whereupon the command line will invoke the first application program, open the first data file, execute the script, copy the new data in the richest compatible data format, and paste the new data into the second data file in the indicated location.

In the second instance, a reference link to the query file is embedded in the data of the second data file and may take two forms, depending upon whether the second application program supports object linking and embedding. If the application program does not support object linking and embedding as implemented, for example, in Microsoft Windows OLE 2.0, the user may click on the embedded reference and the query mechanism of the present invention will invoke and execute the query and copy the new data into the second data file as described just above; that is, the query will include the command, instructions or routines necessary to perform the copy operation as well as the operations on the source data. If the application program does support object linking and embedding as implemented, for example, in Microsoft Windows OLE 2.0, the embedded reference will be in the form of a link to an object containing the query, and the user may invoke the query by clicking on the reference or by invoking the query. The query mechanism will then open the first data file, perform the query operations and pass the new data to the second file through the integrated operating environment's data exchange mechanism, such as Microsoft Window's Dynamic Data Exchange (DDE) and Object Linking and Embedding (OLE 2.0) and the automation support provided in OLE 2.0 through data objects, in the richest compatible data format.

Finally, it will be assumed in the following detailed description of the present invention that the integrated operating environment in which the invention is implemented is comprised of Microsoft Windows, together with the functionality and capabilities of Microsoft Windows as used to implement the present invention. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press.

Those of skill in the relevant arts will readily understand from the following description of the present invention how to implement the present invention using the functionality and capabilities of Microsoft Windows and how to adapt the present invention to other operating system environments, such as New Wave and Macintosh[3]. As such, the following description of the invention will include only such detail as is necessary to understand the implementation and operation of the present invention, but will not include a detailed description of the elements of Microsoft Windows that are used to implement the present invention as such detailed descriptions of these elements are readily and publicly available, as in the above referenced publications.

[3]Macintosh is a trademark of Apple Computer Corporation.

B. Detailed Description (FIG. 1)

As shown in FIG. 1, System 10 includes a plurality of Applications Programs (APPs) 12 executing in an Integrated Operating Environment (Environment) 14 wherein APPs 12 include a First Application Program (FAP) 12A and a Second Application Program (SAP) 12B wherein FAP 12A serves as the source of the first data which is embedded in the second data of SAP 12B. Environment 14, FAP 12A and SAP 12B execute in System 10's Memory Space (MEM) 16 and on a Processor 18 wherein MEM 16 includes System 10's operating memory, such as random access memory, and System 10's storage memory, which may include disk drives, tape units, file servers, and other systems.

As indicated, FAP 12A includes the Application Executable Code (AEC) 20A and a First Data Object (FDO) 22A, or file, which in turn includes Source Data (SD) 24 and Result Data (RD) 26 wherein AEC 20A operates upon SD 24 under direction of a user to generate RD 26. FAP 12A further includes a Script Generator (SPTGEN) 28 which is available to a user to generate a Script 30 wherein Script 30 is a script, program, routine, macro, instruction or command for directing the FAP 12A to perform an operation or sequence of operations on SD 24 to generate RD 26. It will be understood that a user may also us the functions of AEC 20A to operation upon SD 24 to generate RD 26 and will generally do so to create the original version of RD 26. FAP 12A will also generally include a Menu Resource (MENR) 28A which provides an interface, such as menus, to the user and through which the user directs the operations of FAP 12A.

Referring now to SAP 12B, as indicated SAP 12B includes Application Executable Code (AEC) 20B which performs operations upon data residing in a Second Data Object (SDO) 22B, or data file, under the direction of a user and will generally include a Menu Resource (MENR) 28B which provides an interface, such as menus, to the user and through which the user directs the operations of SAP 12B.

As represented, SDO 22B will, in those instances of SAP 12B which supports object linking and embedding as implemented, for example, in Microsoft Windows OLE 2.0, include one or more References (REFs) 32 with corresponding Sites 34 wherein each SITE 34 is an object for embedding first data from a FAP 12A and each REF 32 indicates the location of the first data in SDO 22B. Each Site 34 is associated with and supports a Site Interface (SITI) 36 which is comprised of the interfaces between the Site 34 object and the functions of Environment 14 that are supported by the Site 34. In the instance of a Microsoft Windows compatible application which supports OLE 2.0, for example, SITI 36 would include interfaces for IOleClientSite::and IAdviseSink::. In the instance of an SAP 12B which supports object linking and embedding as implemented, for example, in Microsoft Windows OLE 2.0, SAP 12B will also include a Reference Insert interface (Insert) 38 to the OLE 2.0 functions for inserting linking and embedding references, that is, Sites 34, into the SDOs 22B of that SAP 12B.

First considering the instance of an SAP 12B which supports object linking and embedding as implemented, for example, in Microsoft Windows OLE 2.0, the user will operate through the OLE 2.0 functions (Insert 38) for inserting a lining and embedding reference to create a Site 30 for the first data, such as RD 26, to be embedded into SDO 22B from FDO 22A and to create the SITI 32 for that Site 30. As is well known to those of skill in the arts and familiar with Environments 14 such as Microsoft Windows, the insertion of a Site 34 includes the steps of inserting the corresponding REF 32, creating the Site 34 object and assigning a Moniker 40 to the Site 34 wherein each Moniker 40 includes Location Items (LOCITs) 42 comprising information used by the functions of Environment 14 to identify and locate an object upon which FAP 12A or a corresponding local handler is to operate to provide the embedded first data from FDO 22A to SDO 22B. Associated with each Moniker 40 will be a Verb 44 defining an action to be executed or performed with reference to the embedded first data and a Unique Identifier (UID) 46 identifying FAP 12A and the source of the first data and stored in an Environment 14 Registration Database (REGDB) 48.

In the present example, it is assumed that the first data from FDO 22A is comprised of RD 26, but the first data may also be comprised of SD 24 or, with two Sites 34, both RD 26 and SD 24. In the present invention, however, the LOCITs 42 of Moniker 40 do not resolve to an identification of RD 26, but instead resolve to identify Script 30. The corresponding Verb 44 accordingly does not define an action or operation to be performed with respect to data, but instead directs FAP 12A to execute the Script 30.

Thereafter, the user of SAP 12B may update SDO 22B with the most recent version of RD 26, as based upon the most recent version of SD 24, by invoking the corresponding Site 34, usually by "clicking" on the REF 32 in SOD 22B corresponding to the Site 34. As is well known to those of skill in the arts and familiar with Environments 14 such as Microsoft Windows, the SITI 36 corresponding to the Site 34 will respond to this invocation by issuing a request for the corresponding Moniker 40, for example, through IOleClientSite::, and Environment 14 will respond to the request by resolving Moniker 40 to obtain LOCITs 42 of the first data, the Verb 44 defining the action or operation to be performed, and the UID 46 of the FAP 12A.

In this regard, and is well known to those familiar with Environment 14 such as Microsoft Windows, the Verb 44 may be as the default verb of the Moniker 40 creation process, may be defined by the user as part of the process of creating the Moniker 40, or may be provided to the user of SAP 12B as a menu pick choice defined in an Insert Menu Resource (IMENR) 50 created during the creation of Moniker 40 and either to the SAP 12B menus or provided as a "pop-up" menu associated with the invocation of the Site 32.

The object linking and embedding mechanisms of Environment 14 will then invoke the FAP 12A identified by the UID 46 and will provide the LOCITs 42 and Verb 44 to the FAP 12A and the FAP 12A will perform the operation identified by the Verb 44 the object identified by the LOCITs 42, that is, will execute the Script 30. The Script 30 in turn will contain an identification of SD 24 and RD 26 and the operations to be executed in SD 24 to generate RD 26 and will execute these operations to generate a new version of RD 26 based upon the current SD 24.

The Environment 14 object linking and embedding mechanisms will then provide new version of RD 26 to Site 32 through the standard Data Exchange Mechanisms (DEMs) 52 of Environment 14. In Microsoft Windows, for example, these DEMs 52 will include Dynamic Data Exchange (DDE), Object Linking and Embedding (OLE 2.0) and the automation support provided in OLE 2.0 through data objects. The use and operations of such native data transfer facilities is well known to those of skill in the relevant arts and as such will not be discussed further herein.

Finally, in the instance of those SAPs 12B which do not support object linking embedding as implemented, for example, in Microsoft Windows OLE 2.0, the above described mechanism of a SITI 34, Moniker 38, Verb 44 and UID 46 are effectively not available and the method is modified to utilize the copy and paste operations available in OLE 10.0 and OLE 2.0 rather than the object linking and embedding functions.

In this instance, a REF 32 is again inserted into SDO 22B to represent and identify the location of the RD 26 and an object corresponding to a Site 34 is created to receive the RD 26, as is well understood in copy and paste operations in Environments 14. The Script 30 is then invoked through a menu pick embedded in SAP 12B, either as an addition to SAP 12B's menus or as a pop-up menu associated with the REF 32 such as IMENR 50 as described above, rather than through the object linking and embedding functions and wherein the menu pick includes a command line or script which identifies FAP 12A and Script 30 and which directs that FAP 12A be invoked and Script 30 be executed.

The Script 30 again includes the macros, scripting, routines, commands or instructions necessary to execute the operations to generate RD 26 from SD 24 and further includes the macros, scripting, routines, commands or instructions necessary to direct the Environment 14 copy and paste functions to execute a copy and paste operation between FDO 22A and SDO 22B to copy the resulting RD 26 from FDO 22A to the identified location in SDO 22B.

In summary, therefore, the present invention provides a means for integrating first data created by a first application program and residing in a first data file or object belonging to the first application into a second data file or object belonging to a second application, or into a second data file or object of the first application, where the first data is result data generated by operation of the first application program upon source data of the first application program. The user will create a "script" which is stored as an object or file in the system wherein the "script" directs the first application program to perform the operations on the source data that are necessary to generate the result data. The user will insert a reference to the script into the second data file, either as a reference in the second data file or as an associated command line or script in the second application program The user may then update the embedded data by invoking the representation of the embedded data, whereupon the system will invoke the first application program and direct the first application program to execute the referenced script. The first application program will open the first data file, execute the script, and provide the new data in the richest compatible data format to the second application program to appear in the second data. While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a computer system including a plurality of applications programs and objects for storing data, a memory and processor for storing and executing the application programs, and an integrated operating environment, a method for integrating result data from a first data object into a second data object wherein the result data is generated by operations performed on source data by an application program, comprising the steps of:

creating and storing a script identifying the source data and directing the operation of the application program to generate the result data from the source data, inserting into the data of the second data object a reference to the script, the reference containing information identifying the script and the application program that is to execute the script and identifying an operation to be performed by the application program in executing the script, invoking the reference to indicate that a current version of the result data derived by operation upon a current version of the source data is to be provided to the second data object, resolving the reference to identify the script, to identify the application program that is to execute the script and to identify the operation to be performed by the application program in executing the script, invoking the application program to execute the script to generate the result data from the source data, and providing the result data to the second data object.

2. The method of claim 1 for integrating result data from a first data object into a second data object wherein the result data is generated by operations performed on source data by an application program, wherein the step of inserting the reference further comprises the steps of:

inserting the reference into the second data object at the location in the second data object where the result data is to appear, creating a corresponding result data object to receive the result data, creating a corresponding interface defining operations of the integrating operating environment to be performed with respect to the result data object, and creating a moniker corresponding to the result data object, including information identifying the script, providing a verb identifying the operation of the application program to execute the script, and obtaining a unique identifier identifying the application program from an application program registration database of the integrated environment.

3. The method of claim 2 for integrating result data from a first data object into a second data object wherein the result data is generated by operations performed on source data by an application program, wherein the step of resolving the reference further comprises the steps of:

resolving the moniker information identifying the script to identify the location of the script in the computer system, indexing the program registration database with the unique identifier to identify the application program, and providing the identification of the application program, the location of the script and the verb to the application program.

4. The method of claim 1 for integrating result data from a first data object into a second data object wherein the result data is generated by operations performed on source data by an application program, wherein the step of providing the result data to the second data object further comprises the steps of:

invoking a data exchange mechanism of the integrated operating environment, and providing the result data to the data exchange mechanism of the integrated operating environment.

5. The method of claim 1 for integrating result data from a first data object into a second data object wherein the result data is generated by operations performed on source data by an application program, wherein:

the step of creating and storing a script further includes providing in the script commands directing a data exchange mechanism of the integrated operating environment to provide the result data to the second data object, the step of inserting a reference to the script in the second data object further includes, providing in association with an application program for operating upon the second data object a second script directing the invocation of the application program of the first data object, the second script directing the application program associated with the second data object for requesting an exchange of the result data from the first data object, the second script identifying the result data and the application program of the first data object and directing the execution of the script associated with the application program of the first data object, the step of invoking the reference to indicate that a current version of the result data derived by operation upon a current version of the source data is to be provided to the second data object further includes the step of invoking the second script, and the step of invoking the application program to execute the script to generate the result data from the source data further comprises the step of invoking the application program associated with the first data object and providing the identifications of the application program associated with the first data object and the associated script to the application program associated with the first data object, and the step of providing the result data to the second data object further includes the steps of invoking the data exchange mechanism of the integrated operating environment and providing the result data to the data exchange mechanism.

6. The data integration mechanism of claim 5 for integrating result data from a first data object into a second data object wherein the result data is generated by operations performed on source data by an application program, further comprising:

a data exchange invocation mechanism for invoking a data exchange mechanism of the integrated operating environment.

7. The data integration mechanism of claim 5 for integrating result data from a first data object into a second data object wherein the result data is generated by operations performed on source data by an application program, further including:

in the script associated with the first data object, commands directing a data exchange mechanism of the integrated operating environment to provide the result data to the second data object, a second script in association with an application program for operating upon the second data object a second script for directing the invocation of the application program of the first data object, the second script directing the application program associated with the second data object for requesting an exchange of the result data from the first data object, the second script identifying the result data and the application program of the first data object and directing the execution of the script associated with the application program of the first data object, the reference invocation mechanism is responsive to the invocation of the reference to indicate that a current version of the result data derived by operation upon a current version of the source data is to be provided to the second data object by invoking the second script, and the second script is responsive to the invocation of the second script for invoking the application program associated with the first data object and providing the identifications of the application program associated with the first data object and the associated script to the application program associated with the first data object, and the script associated with the first data object is responsive to the invocation of the script associated with the first data object for invoking the data exchange mechanism of the integrated operating environment and providing the result data to the data exchange mechanism.

8. In a computer system including a plurality of applications programs and objects for storing data, a memory and processor for storing and executing the application programs, and an integrated operating environment, a data integration mechanism for integrating result data from a first data object into a second data object wherein the result data is generated by operations performed on source data by an application program, comprising:

a script generator for creating and storing a script identify the source data and directing the operation of the application program to generate the result data from the source data, a reference insertion mechanism for inserting into the data of the second data object a reference to the script,
the reference containing information identifying the script and the application program that is to execute the script and identifying an operation that is to be performed by the application program in executing the script, a reference invocation mechanism for invoking the reference to indicate that a current version of the result data derived by operation upon a current version of the source data is to be provided to the second data object, a reference resolution mechanism for resolving the reference to identify the script, to identify the application program that is to execute the script and an operation that is to be performed by the application program in executing the script, an application invocation mechanism for invoking the application program to execute the script to generate the result data from the source data, and a data exchange mechanism for providing the result data to the second data object.

9. The data integration mechanism of claim 8 for integrating result data from a first data object into a second data object wherein the result data is generated by operations performed on source data by an application program, further comprising:

a reference insertion mechanism for inserting the reference into the second data object at the location in the second data object where the result data is to appear, an object creation mechanism for creating a corresponding result data object to receive the result data, an interface definition mechanism for creating a corresponding interface defining operations of the integrating operating environment to be performed with respect to the result data object, and a moniker creation mechanism for creating a moniker corresponding to the result data object, including information identifying the script,
providing a verb identifying the operation of the application program to execute the script, and
obtaining a unique identifier identifying the application program from an application program registration database of the integrated operating environment.

10. The data integration mechanism of claim 9 for integrating result data from a first data object into a second data object wherein the result data is generated by operations performed on source data by an application program, further comprising:

a moniker resolution mechanism for resolving the moniker information identifying the script to identify the location of the script in the computer system,
indexing the program registration database with the unique identifier to identify the application program, and
providing the identification of the application program, the location of the script and the verb to the application program.

* * * * *